(No Model.)
L. ALEXANDER.
SLIDING GUARD FOR EYEGLASSES.
No. 441,917. Patented Dec. 2, 1890.
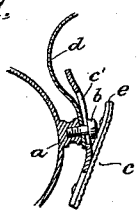
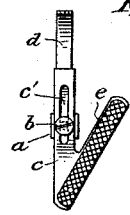
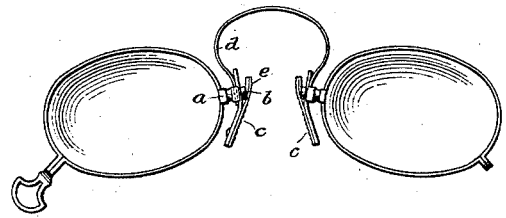
Witnesses
Geo. W. Breck
Adam Rosenberg
Louis Alexander, Inventor
By his Attorney Isaac W. Jacobson

UNITED STATES PATENT OFFICE.

LOUIS ALEXANDER, OF BROOKLYN, NEW YORK.

SLIDING GUARD FOR EYEGLASSES.

SPECIFICATION forming part of Letters Patent No. 441,917, dated December 2, 1890.

Application filed May 17, 1890. Serial No. 352,193. (No model.)

*To all whom it may concern:*

Be it known that I, LOUIS ALEXANDER, a citizen of the United States, residing in the city of Brooklyn, county of Kings, State of New York, have invented a certain new Adjustable Sliding Guard for Eyeglasses, of which the following is a specification, reference being had to the accompanying drawings, forming part of the same.

This invention relates to devices for adjusting eyeglasses to the eye in such a manner that the center of the lens meets the pupil of the eye at its center whenever the relative position of the eyeglasses to the eye when in use should so require; and it consists of a V-shaped form, which is called a "guard." This guard is fastened to the post attached to either the frame of the eyeglasses or directly to the eyeglasses by a small screw passing through an elongated aperture or slot in that side or flange of the guard farthest from the eye when in use, and then through a corresponding hole at the end of the nose-spring, which is placed right between the two projecting sides of the post, which is attached to the frame of the eyeglasses and beside a corresponding screw-hole. The flange, with the slot, can be readily made to slide up and down along the whole length of the slot, brushing the screw as soon as the screw is loosened a little, and this constitutes the chief advantage of this invention, besides many others.

In the accompanying drawings, Figure 1 is a perspective view of this new adjustable sliding guard, showing the outlines of the guard attached to the left side of the nose-spring and the frame-piece of the left-hand eyeglass. Fig. 2 is a central sectional drawing showing the exact position of the guard when attached to any side of the nose-spring. Fig. 3 is a full view of an eyeglasses with the guards attached thereto.

The guard is of one piece, made of any suitable material, such as metal coated with bone, cork, ivory, shell, and the like, and presents two flanges, the front flange and the back flange. The front flange $c c'$ is that part of the V-shaped guard attached to the frame of the eyeglasses and conforming as much as practicable to the curvature of that end piece of the nose-spring $d$ along which it can be made to slide up and down within the slot $c'$. $b$ is the top or head of the screw, and $a$ shows the post.

The back flange $c e$, resting when the eyeglasses are in use in the cavity between the upper part of the nose and the eye, joins the front flange at $c$, so that both flanges present an acute-angled V-shaped form. This back flange holds the eyeglasses at a proper distance from the eye and rests in such a way in the above-described cavity that it is entirely concealed from the front view. The slot $c'$ in the front flange permits the guard to be shifted up and down along the end of the nose-spring $d$, so as to adjust the center of the lens to the center of the pupil of the eye, and it will be observed that this is accomplished without detaching any of the parts by slightly loosening the screw and fastening it again when in the desired position.

As shown in Fig. 3, the guard is so adjusted that the screw is fastened just within about the center of the slot. Should by the widening of the nose-spring when in use, as it ordinarily will, the eyeglasses sink a little lower, so that the focal line of the eye strikes the glass a little above its center, the guard is correspondingly, after loosening the screw, shifted a little higher and the screw is fastened a little below the center of the slot, and vice versa. It will be observed that in this way the eyeglasses can be always applied in such a manner as to allow the focal line of the eye to meet the center of the lens. Heretofore this advantage has never been arrived at by any of the inventions in the same line. There have been adjustable guards invented and patented which will but imperfectly hold the eyeglasses at a proper distance from the eye; but there has never been a sliding adjustable guard for eyeglasses invented which will not only hold the glasses when in use at the proper distance, but also allow the same to be easily adjusted on either side, so that the focal line of the eye will always meet the center of the lens.

Another advantage of this invention consists in this, that the eyeglasses can thereby be adjusted so that the nose piece or spring will be held at extreme height of the nose, where it properly belongs, and at the same time the glasses can be moved downward, if required. In other eyeglasses the nose-piece is fixed to the glass without possibility of adjusting the same accordingly. This is of great importance, especially in the case of cylinder glasses, where the axis of the glass must be accurately fitted into the frame, so as to coincide with the axis of the frame.

The guard can be attached to any frame and with the ordinary screw used in eyeglasses. There is a particular advantage offered by this invention in the case of these cylinder glasses, where doctors usually prescribe spectacles because of the very reason that the center of the pupil of the eye should be joined with the center of the glass by the focal line emanating from the eye, and the latter should not meet the lens either above or below its center, but exactly at its center. Through my invention eyeglasses can be made to serve the same purpose in a far more perfect and scientific manner.

Having now described my invention, what I claim, and desire to secure by Letters Patent, is—

1. An adjustable sliding guard for eyeglasses, (being offset,) consisting of a V-shaped form with one side or flange perforated by an elongated aperture, said flange being so shaped as to allow it to be shifted up and down the end piece of the nose-spring, and to be there adjusted so that the axis or center of the lens will always be met by the focal line of the eye, substantially as described.

2. An adjustable sliding guard for eyeglasses, (being offset,) consisting of a V-shaped form with one side or flange perforated by an elongated aperture, said flange being so shaped as to allow it to be shifted up and down the end piece of the nose-spring and to be there adjusted, the two flanges of the guard—to wit, the back flange and the perforated one—forming together an acute-angled V-shaped device, substantially as described.

3. The adjustable sliding guard (being offset) consisting of one V-shaped piece presenting a perforated front flange $c$ $c'$ and a back flange $c$ $e$, the back flange being so joined to the front one as to become either perfectly concealed or hardly noticeable when the eyeglasses are in use, and the guard being so adjustable as to keep the nose-piece at its proper height on the nose and at the same time bringing the focal line of the eye in a direction at right angles with the axis of the lens, substantially as described.

LOUIS ALEXANDER.

Witnesses:
 ADAM ROSENBERG,
 ISAAC W. JACOBSON.